SEMICONDUCTOR DEVICE FOR GENERATING MODULATED RADIATION

Filed Dec. 15, 1958

INVENTORS
RUBIN BRAUNSTEIN &
EGON E. LOEBNER
BY J. L. Whittaker
ATTORNEY

United States Patent Office 3,102,201
Patented Aug. 27, 1963

3,102,201

SEMICONDUCTOR DEVICE FOR GENERATING MODULATED RADIATION

Rubin Braunstein and Egon E. Loebner, Princeton, N.J., assignors to Radio Corporation of America, a corporation of Delaware Filed Dec. 15, 1958, Ser. No. 780,523
2 Claims. (Cl. 250—199)

The present invention relates to a new and improved circuit for modulating the radiation produced by a solid state device.

The device of the invention is one in which injected charge carriers can recombine in two competing ways, at least one of which is radiative. A signal applied to modulate the second of the recombination processes produces a corresponding modulation of the emission due to first (the radiative one).

In a specific form of the invention, the device consists of a germanium diode having a P-N junction. The two competing charge carrier recombination processes include one in the bulk of the crystal which is radiative and one at the surface of the crystal which is non-radiative or at least substantially non-radiative within the spectral range of the bulk recombination process. An electrode which is permeable to the radiative emission is placed next to a surface of the crystal. An electric field which is modulated in accordance with an input signal is applied between the electrode and said surface to thereby modulate the surface recombination velocity. This, in turn, modulates the radiative recombination process so that the emission from the device through the permeable electrode is modulated. In the case of this specific device, the radiation is in the infrared region although the invention is not limited to this portion of the spectrum. The device is an amplifier in the sense that a small change in the modulating signal produces a much larger change in the radiation signal.

The invention will be described in greater detail by reference to the following description taken in connection with the accompanying drawing in which.

Figure 1:
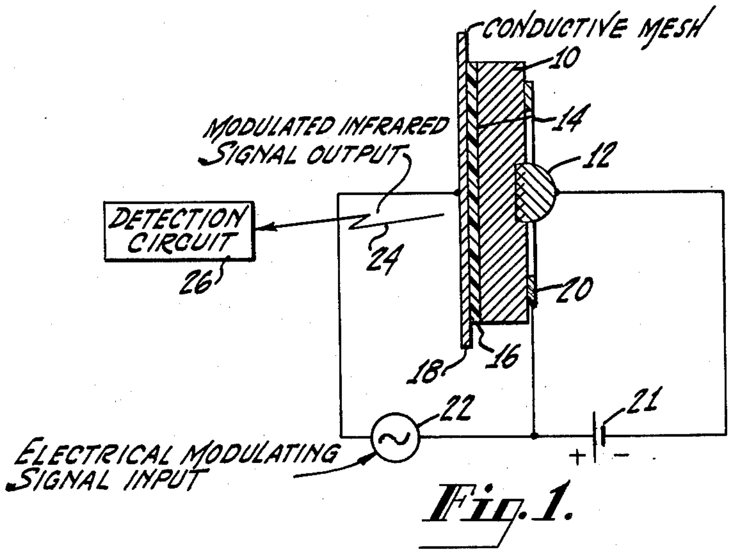
FIG. 1 is a schematic circuit diagram of one form of the present invention.
Figure 2:
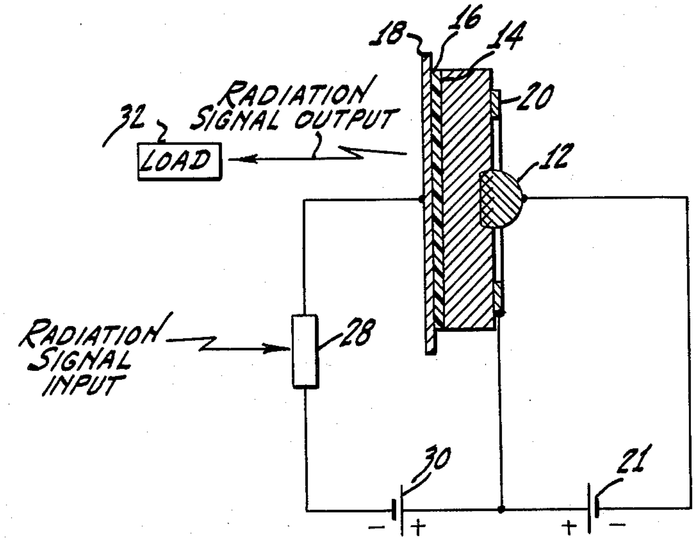
FIG. 2 is a schematic circuit diagram of another form of the invention.

The semiconductor device shown in FIGS. 1 and 2 consists of a body 10 of semiconductor material such as a single crystal of P-type germanium. Alloyed into one surface of the crystal is a dot 12 of lead-antimony, for example, to form a P-N junction. After alloying, the surface of the crystal may be etched by immersing the same in $CP_4$ (50 cc. $HNO_3$, 30 cc. $CH_3COOH$, 30 cc. HF, 0.6 cc. Br). An insulating layer 16 formed of mylar or the like is adjacent to surface 14 of the crystal. Layer 18 consists of a conductive mesh electrode formed, for example, of approximately 4 mil copper wires spaced approximately 15 mils apart. A Kovar ring electrode 20 in ohmic contact with the crystal is located on the same surface of the crystal as the dot.

Carriers are injected into the P-N diode described by applying a direct voltage from source 21 between dot 12 and Kovar ring 20. The input modulating signal is applied from source 22 across the conductive mesh electrode 18 and the Kovar ring 20.

In operation, some of the charge carriers injected into the germanium diode recombine in two competing ways. One is a radiative recombination in the bulk of the crystal. This radiative recombination produces emission in the infrared region which passes through the mesh 18. The emission is indicated schematically by arrow 24. The competing recombination process is non-radiative or at least non-radiative in the frequency band of the radiative recombination process, and occurs at the surface, such as 14, for example, of the germanium crystal. Applicants have found that the surface recombination velocity can be electrically modulated by applying the modulating signal between the conductive mesh electrode 18 and the surface 14 and that, since the surface recombination process competes with the radiative recombination process, a change in the former causes a proportional change in the latter. The modulated electric field therefore applied to control the surface recombination velocity indirectly controls the radiative recombination. The result is a modulated infrared signal output, as indicated at 24.

One practical form of the invention may have the following parameters:

Size of germanium wafer—7 mils thick, 1½" in diameter;
Size of indium dot—⅜" in diameter;
Insulating layer 16-mylar, 1 mil thick;
Resistivity $\rho$ of germanium—0.2 ohm centimeters (P-type);
Source 20—2 volts; 100 milliamperes or more of current;
Source 22—400 cycles, 200–600 volts;
Capacity between conductive mesh and surface 14—10 micromicrofarads;
Measured infrared radiation in the absence of a modulating signal—1,000 microwatts;
Modulation produced—90%.

In a practical circuit, the infrared signal output may be measured by a circuit 26 which includes a lead sulphide cell which receives the radiation, a calibrated amplifier for amplifying the signal output of the lead sulphide cell, and an oscilloscope for displaying the amplified signal.

The device shown in FIG. 1 is an amplifier in the sense that a small change in the modulating signal at 22 produces a much larger change in the radiative output signal at 24. In the practical circuit discussed, the electromagnetic radiant power output was $10^{-3}$ watts whereas the modulating electric power dissipated in the device was about $10^{-7}$ watts. This resulted in a power gain of approximately $10^4$.

The circuit shown in FIG. 2 is similar to the one shown in FIG. 1 except that a photoconductive element 28 and a D.C. source 30 are substituted for the modulating signal source 22. The device of FIG. 2 may be thought of as a radiation amplifier. The input signal now is in the form of light or some other radiation to which photocell 28 is responsive. The input signal, for example, may be in the infrared, the visible light or the ultra-violet region, depending on the characteristics of cell 28. Even more broadly speaking, the signal can be in the radio frequency or X-ray region provided that element 28 is one which changes its impedance in response to that radiation. The effect of the modulating signal, in any case, is to change the impedance in series with source 30 and thereby to change the electric field produced by the source between the conductive mesh 18 and the surface 14. The change in electric field acts in exactly the same manner as it does in FIG. 1. In brief, it alters the surface recombination velocity which, in turn, alters the radiation recombination velocity and thereby the radiation signal output. This signal may be detected or, if desired, applied to a light amplifier or the like and observed. The means receptive of the radiation signal is illustrated generically by the block 32 legended "load."

The device of FIG. 2 is an amplifier in the same sense as the one of FIG. 1. However, in the device of FIG. 2, the gain is even higher since the gain of the photoconductive device itself must be taken into account.

In the circuits chosen for illustration, the solid state device is a germanium diode with a P-type wafer, N-type dot and P-type surface. Devices made of other materials may be used instead as, for example, gallium arsenide, indium phosphide, gallium phosphide, gallium antimonide, silicon carbide, and others.

In the two circuits discussed above, the radiation produced is in the infrared region of the spectrum. However, it is believed that the principles enunciated are applicable to many other types of devices, many of which produce radiation in the visible region of the spectrum. The invention has extremely important applications in electrical-optical energy conversion systems and in light amplifiers. In the first-mentioned application, an electrical signal at a low power level is capable of producing a radiation signal in the visible or other selected region of the spectrum at a much higher power level. In the second application, radiation at a low power level in the visible or non-visible region of the electromagnetic spectrum is converted to radiation at a higher power level in a selected region of the electromagnetic spectrum.

What is claimed is:

1. In combination, a semiconductor device including a body of semiconductor material with a dot of material alloyed into one surface to form a P-N junction, said device being of the type in which charge carriers recombine in two competing ways at least one of which is radiative, an electrode in ohmic contact with said body on said one surface, a conductive mesh electrode insulated from a second surface of said body, means connected between said first electrode and said dot for continuously injecting charge carriers into said device to thereby cause emission therefrom through said mesh electrode at a frequency characteristic of the radiative recombination of the charge carriers, and means separate from said injecting means for applying a modulating signal between said first electrode and said mesh electrode for modulating the recombination process competing with said radiative recombination to thereby modulate the emitted radiation.

2. In combination, a semiconductor device including a body of semiconductor material having a first electrode alloyed into one surface of said body to form a P-N junction, said device being of the type in which charge carriers recombine radiatively in the bulk of the device within a given frequency band and recombine at the surface of said device, a second electrode in ohmic contact with said body on said one surface, a conductive mesh electrode insulated from a second surface of said body, means connected between said first and second electrodes for injecting charge carriers into said device at a constant rate to thereby cause emission therefrom through said mesh electrode at a frequency characteristic of the radiative recombination of the charge carriers, and means separate from said charge carrier injecting means for applying a modulating signal between said mesh electrode and said second electrode to modulate by said signal the charge carrier surface recombinations and thereby to vary according to said signal the number of charge carriers present in the bulk of said device for said radiative recombinations, whereby said emitted radiation from said device is modulated in accordance with said modulating signal.

References Cited in the file of this patent

UNITED STATES PATENTS

| | | |
|---|---|---|
| 2,683,794 | Briggs | July 13, 1954 |
| 2,692,952 | Briggs | Oct. 26, 1954 |
| 2,776,367 | Lehovec | Jan. 1, 1957 |
| 2,885,562 | Marinace | May 5, 1959 |
| 2,900,531 | Wallmark | Aug. 18, 1959 |